C. PFAU.
VALVE BALL.
APPLICATION FILED OCT. 20, 1909.
1,129,226.
Patented Feb. 23, 1915.
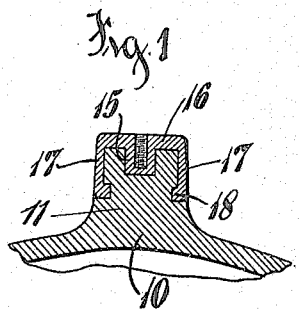
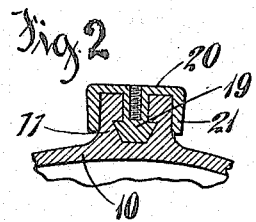
Witnesses
Oliver D. Harman
Florence Hammel
Inventor
Charles Pfau
By James N. Ramsey
Attorney

UNITED STATES PATENT OFFICE.

CHARLES PFAU, OF NORWOOD, OHIO, ASSIGNOR TO THE PFAU MANUFACTURING COMPANY, OF NORWOOD, OHIO, A CORPORATION OF OHIO.

VALVE-BALL.

1,129,226.  Specification of Letters Patent.  Patented Feb. 23, 1915.

Application filed October 20, 1909. Serial No. 523,572.

*To all whom it may concern:*

Be it known that I, CHARLES PFAU, a citizen of the United States, residing at Norwood, in the county of Hamilton and State of Ohio, have invented certain new and useful Improvements in Valve-Balls, of which the following is a specification.

My invention relates to valve balls for escape valves for flushing tanks for water closets.

It has been found that when it is desired to replace a valve ball in a flushing tank that it is very often a difficult matter to unscrew the rod which is screwed into the short coupling member placed in the top of the valve ball, and which serves as a connecting rod between the valve ball and the operating mechanism. In unscrewing the connecting rod while detaching it from the coupling member placed in the top of the valve ball the entire coupling member very often turns in the valve ball with the connecting rod and therefore necessitates the workman reaching down into the flushing tank and grasping the top of the valve ball with a suitable tool, such as pliers, etc., in order to hold the coupling tightly and keep it from turning with the connecting rod.

It is a well known fact that water will expand rubber and the longer a rubber valve ball is in practical use the larger it becomes, and it has been found that the rubber will fall away from the coupling members which are placed in the neck of the balls now in use.

The object of my invention is to provide means whereby the coupling member which is placed in the top of the valve ball is held firmly at all times against turning in the neck of the valve ball. To accomplish this result I provide a rubber valve ball having a neck at the top, with a metal coupling member placed in such a manner as to limit or confine the rubber in the neck of the valve ball to a given space.

My invention consists in the novel features herein set forth and claimed.

In the drawing: Figure 1 shows a preferred construction of the coupling member and formation of the neck of the valve ball. Fig. 2 is a modification of the same.

In the embodiment of my invention as illustrated, 10 indicates a portion of the common form of elastic rubber valve ball and 11 the neck of said valve ball. To confine the rubber of the valve ball neck within a limited and given space and thereby hold the coupling member securely clamped in contact therewith at all times I provide the means illustrated in Figs. 1 and 2.

In Fig. 1, I show a member which (instead of having the well known wedge-shaped portion 19 shown in Fig. 2, to keep it from pulling out or away from the neck of the valve ball) has an annular wall 17 turned in at the bottom to form a flange 18, which, when the rubber expands, forms means for preventing the coupling member from pulling away from the valve ball. This style of coupling member has a top 16 and an extension 15 in the center thereof, projecting downwardly into the neck of the flexible rubber valve ball to allow the coupling member to be tapped deep enough to permit a substantial connection for the connecting rod.

In Fig. 2 the coupling member or spud 19 is provided with a top 20 having an annular wall 21 projecting downwardly therefrom and if desired this manner of limiting and confining the expansion of the rubber of the neck of the flexible rubber valve ball may be used. This coupling member may be easily placed upon the neck of the valve ball while it is being molded, as a suitable receptacle can be constructed in the bottom of the mold to allow the coupling member to be placed therein. Then the rubber may be placed in the usual way in the mold and pressed down into the coupling member and when water is placed in the ball just after it has been pressed properly into the mold and the mold is placed in a suitable steam oven the rubber will expand and will assume the exact shape of the walls of the mold, and the rubber in the neck of the valve ball being confined to a limited space by the walls of the coupling member said member will become sufficiently tight upon the neck of the valve ball as not to be pulled off. As above stated, the rubber valve ball becomes larger the longer it is put to practical use. This will serve to tighten the coupling members upon the necks of the valve balls instead of loosening them as it does in the valve ball now in use.

I claim:

1. In combination with a valve ball having a flexible rubber neck, of a metallic threaded coupling member embedded in the center of said rubber neck, an annular metal wall integral therewith and covering the outside of said rubber neck, an inwardly projecting flange on said annular wall at the bottom thereof and adapted to be embedded and molded in said rubber neck, substantially as and for the purposes set forth.

2. In combination with a hollow flexible rubber valve ball, of a metal cap at the top of same having an annular wall, said annular wall having an inwardly extending flange at the bottom thereof adapted to embed itself in the rubber of said ball to prevent said cap from being removed and a downwardly extending spud at the middle of said cap being embedded in the rubber of said ball, and having a threaded opening therein to form attaching means for suspending said ball.

3. In combination with a valve ball having a flexible rubber neck, of a metallic threaded coupling member embedded in said rubber neck and forming a spud therein, an annular metal wall integral with said spud and extending over said rubber neck, and one of said members, i. e., the spud and annular metal wall, having a lateral projection for securing the coupling to said flexible rubber neck.

CHARLES PFAU.

Witnesses:
James N. Ramsey,
Urbane B. Gillett.

Copies of this patent may be obtained for five cents each, by addressing the "Commissioner of Patents, Washington, D. C."